United States Patent
Haari et al.

(10) Patent No.: US 9,422,489 B2
(45) Date of Patent: Aug. 23, 2016

(54) PRESSURE EQUALIZING STRUCTURE AND PRESSURE EQUALIZING METHOD FOR GASIFICATION FURNACE APPARATUS

(71) Applicant: MITSUBISHI HITACHI POWER SYSTEMS, LTD., Kanagawa (JP)

(72) Inventors: Kenta Haari, Tokyo (JP); Osamu Shinada, Tokyo (JP); Yasunari Shibata, Tokyo (JP)

(73) Assignee: MITSUBISHI HITACHI POWER SYSTEMS, LTD., Kanagawa (JP)

( * ) Notice: Subject to any disclaimer, the term of this patent is extended or adjusted under 35 U.S.C. 154(b) by 154 days.

(21) Appl. No.: 14/367,445

(22) PCT Filed: Jan. 30, 2013

(86) PCT No.: PCT/JP2013/052114
§ 371 (c)(1),
(2) Date: Jun. 20, 2014

(87) PCT Pub. No.: WO2013/118626
PCT Pub. Date: Aug. 15, 2013

(65) Prior Publication Data
US 2014/0345198 A1    Nov. 27, 2014

(30) Foreign Application Priority Data

Feb. 10, 2012    (JP) .................................. 2012-027417

(51) Int. Cl.
*C01B 3/36* (2006.01)
*C10J 3/72* (2006.01)
(Continued)

(52) U.S. Cl.
CPC  *C10J 3/72* (2013.01); *C10J 3/485* (2013.01); *C10J 3/74* (2013.01); *C10J 3/86* (2013.01); *C10J 2300/093* (2013.01); *C10J 2300/1653* (2013.01); *Y02E 20/16* (2013.01); *Y02E 20/18* (2013.01)

(58) Field of Classification Search
CPC ................................ C10J 3/72; F28F 2265/12
See application file for complete search history.

(56) References Cited

U.S. PATENT DOCUMENTS 3,994,702 A * 11/1976 Schweimanns ............ C10J 3/52
110/165 R
5,230,717 A * 7/1993 Ogawa ..................... C10J 3/485
122/7 R (Continued)

FOREIGN PATENT DOCUMENTS

CN    101280223    10/2008
EP    0 459 414    12/1991

(Continued)

OTHER PUBLICATIONS

Office Action issued Jul. 31, 2015 in corresponding Chinese patent application No. 201380007026.2 (with English translation).

(Continued)

*Primary Examiner* — Imran Akram
(74) *Attorney, Agent, or Firm* — Wenderoth, Lind & Ponack, L.L.P.

(57) ABSTRACT

A pressure equalizing structure that includes: a gasification furnace (3) for gasifying a carbon-containing fuel; a pressure vessel (5) housing the gasification furnace (3); an annulus section (7) filled with an inert gas and provided between the gasification furnace (3) and the pressure vessel (5). A pressure equalizing part (13), which is connected to the gasification furnace (3) to communicate between the inside of the gasification furnace (3) and the inside of the annulus section (7), is provided in a region where the in-furnace gas temperature inside the gasification furnace (3) is higher than the annulus temperature inside the annulus section (7).

4 Claims, 1 Drawing Sheet

(51) Int. Cl.
  *C10J 3/48* (2006.01)
  *C10J 3/86* (2006.01)
  *C10J 3/74* (2006.01)

(56) References Cited

U.S. PATENT DOCUMENTS

2006/0196810 A1* 9/2006 Calderon ............... B01J 4/002
  208/108
2011/0265652 A1* 11/2011 Gu ........................ B01D 46/02
  95/283

FOREIGN PATENT DOCUMENTS

| JP | 61-246290 | 11/1986 |
| JP | 4-33993 | 2/1992 |
| JP | 2001-26789 | 1/2001 |
| JP | 2001-271073 | 10/2001 |
| JP | 2011-68812 | 4/2011 |

OTHER PUBLICATIONS

International Search Report issued Mar. 5, 2013 in International Application No. PCT/JP2013/052114.
Written Opinion of the International Searching Authority issued Mar. 5, 2013 in International Application No. PCT/JP2013/052114.

* cited by examiner

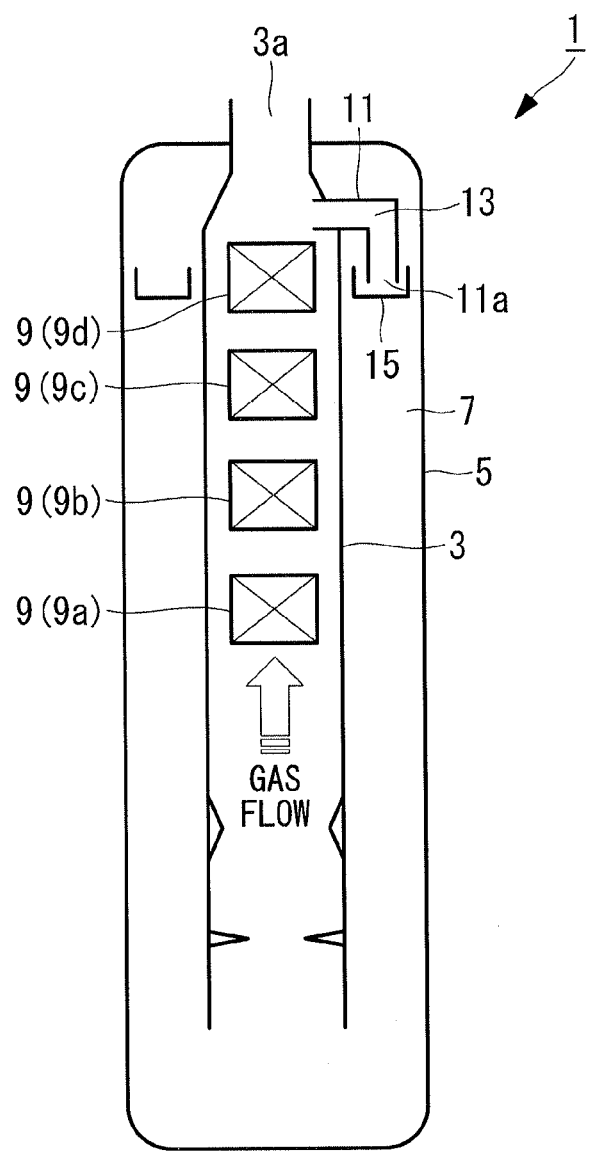

PRESSURE EQUALIZING STRUCTURE AND PRESSURE EQUALIZING METHOD FOR GASIFICATION FURNACE APPARATUS

TECHNICAL FIELD

The present invention relates to a gasification furnace apparatus applied to an apparatus for gasifying a carbon-containing fuel, for example, a coal gasification furnace apparatus. In particular, the present invention relates to a pressure equalizing structure and a pressure equalizing method for a gasification furnace apparatus which suppress changes in differential pressure between the inside of a furnace and the inside of a pressure holding section such as an annulus section.

BACKGROUND ART

Conventionally, there is a known gasification furnace which is applied to a carbon-containing fuel gasification apparatus for gasifying a carbon-containing fuel such as coal. Examples of such gasification furnaces include a double-walled reactor called a tower-type reactor or a cross-over-type reactor.

Typically, a pressure vessel housing a gasification furnace and a heat exchanger, which constitute a gasification furnace apparatus, is provided with an annular space (hereinafter called an "annulus section") filled with an inert gas such as a nitrogen gas and maintained at a high pressure. That is, the gasification furnace apparatus is constituted of a gasification furnace wall forming a passage for an in-furnace gas, and the pressure vessel provided outside the gasification furnace wall and holding the pressure; the annulus section filled with an inert gas is provided between the gasification furnace wall and the pressure vessel in order to protect the pressure vessel from the high-temperature in-furnace gas.

As disclosed in Patent Literature 1, for example, the conventional gasification furnace apparatus is provided with an in-furnace pressure equalizing pipe, which communicates between the inside of the furnace and the annulus section, as a means for directly equalizing the pressures of the inside of the furnace and the annulus section. By directly equalizing the pressures of the inside of the furnace and the annulus section, this in-furnace pressure equalizing pipe allows the gasification operation to be continued in a stable manner even when the differential pressure between the inside of the furnace and the annulus section fluctuates. That is, the in-furnace pressure equalizing pipe functions to suppress increase in the difference in pressure (differential pressure) between the pressures inside the furnace and inside the annulus section in order to protect the gasification furnace wall.

CITATION LIST

Patent Literature

{PTL 1}
Japanese Unexamined Patent Application, Publication No. 2011-68812

SUMMARY OF INVENTION

Technical Problem

In the conventional gasification furnace apparatus, when the pressures are equalized at a place where the gas temperature inside the furnace (hereinafter called "in-furnace gas temperature") is lower than the temperature inside the annulus section (hereinafter called "annulus temperature"), the in-furnace gas flows out into the annulus section at temperature lower than the temperature of the inert gas and causes natural convection inside the annulus section, which results in continuous outflow of the in-furnace gas toward the annulus section. That is, on the downstream side inside the furnace where the in-furnace gas has passed through multiple heat exchangers, the in-furnace gas temperature and the peripheral wall boiler water temperature are reversed, so that a region is created where the in-furnace gas temperature is lower than the annulus temperature.

For example, if the peripheral wall boiler water temperature is approximately 350° C. while the feed water temperature of the economizer is approximately 230° C., then the in-furnace gas temperature downstream the economizer is approximately 250° C. Thus, in this region downstream the economizer, the in-furnace gas temperature is lower than the annulus temperature which is almost equal to the peripheral wall boiler water temperature.

On the other hand, when the in-furnace gas flows out into the annulus section, dust inside the furnace accompanies the in-furnace gas and flows out along with the gas flow at the same time. Since such outflow of accompanying dust can affect the reliability of the pressure vessel or continuous operation of the plant as well as requires time and labor for cleanup, it is desirable to reduce the amount of outflow of the in-furnace gas.

Given such background, it is desirable, in the gasification furnace apparatus for gasifying a carbon-containing fuel, to suppress natural convection occurring inside the annulus section due to the in-furnace gas flowing out into the annulus section, and to reduce the amount of in-furnace gas and accompanying dust flowing out into the annulus section.

The present invention has been made in order to solve the above problems, and an object thereof is to provide a pressure equalizing structure and a pressure equalizing method for a gasification furnace apparatus which can suppress natural convection occurring inside the annulus section due to the in-furnace gas flowing out into the annulus section, and can reduce the amount of in-furnace gas and accompanying dust flowing out into the annulus section.

Solution to Problem

In order to solve the above problems, the present invention has adopted the following solutions.

A pressure equalizing structure for a gasification furnace apparatus of the present invention includes: a gasification furnace for gasifying a carbon-containing fuel; a pressure vessel housing the gasification furnace; and a pressure holding section filled with a pressurizing gas and provided between the gasification furnace and the pressure vessel, wherein a pressure equalizing part, which is connected to the gasification furnace to communicate between the inside of the gasification furnace and the inside of the pressure holding section, is provided in a region where the in-furnace gas temperature inside the gasification furnace is higher than the temperature inside the pressure holding section.

According to this pressure equalizing structure for a gasification furnace apparatus, the in-furnace gas flows out into the pressure holding section at a temperature higher than the temperature of the pressurizing gas and is less likely to cause natural convection, since the pressure equalizing part, which is connected to the gasification furnace to communicate between the inside of the gasification furnace and the inside of the pressure holding section, is provided in a region where the in-furnace gas temperature inside the gasification furnace is higher than the temperature inside the pressure holding section. As a result, continuous outflow of the in-furnace gas toward the pressure holding section is suppressed in the pressure equalizing part, and at the same time, the amount of accompanying dust flowing out along with the flow of the in-furnace gas can be reduced.

In the above-described pressure equalizing structure, the gasification furnace may be a tower type, and the pressure equalizing part may be provided close to the top part of the tower-type gasification furnace. This way, the space above the pressure equalizing part inside the pressure holding section becomes smaller. As a result, the region above the pressure equalizing part, which can create natural convection, becomes smaller, so that the area of convection can be minimized.

In the above-described configuration, it is preferable that the pressure equalizing part includes an open outlet which is open downward inside the pressure holding section; and that a dust tray is disposed under the open outlet. This way, the accompanying dust flowing out into the pressure holding section along with the in-furnace gas during normal operation can be collected in the dust tray. It is desirable that a pipe, etc. forming the pressure equalizing part is bent downward so that the open outlet of the pressure equalizing part is extended close to the dust tray.

In addition, it is preferable that the dust tray in this case is provided annularly inside the pressure holding section so as to surround the outer periphery of the gasification furnace. This way, spill of the collected accompanying dust onto the bottom part of the pressure holding section can be prevented.

A gasification furnace apparatus of the present invention includes: a gasification furnace for gasifying a carbon-containing fuel; a pressure vessel housing the gasification furnace; a pressure holding section filled with a pressurizing gas and provided between the gasification furnace and the pressure vessel; and a pressure equalizing part which is connected to the gasification furnace to communicate between the inside of the gasification furnace and the inside of the pressure holding section, and is provided in a region where the in-furnace gas temperature inside the gasification furnace is higher than the temperature inside the pressure holding section.

According to this gasification furnace apparatus, the in-furnace gas flows out into the pressure holding section at a temperature higher than the temperature of the pressurizing gas and is less likely to cause natural convection, since the pressure equalizing part, which is connected to the gasification furnace to communicate between the inside of the gasification furnace and the inside of the pressure holding section, is provided in a region where the in-furnace gas temperature inside the gasification furnace is higher than the temperature inside the pressure holding section. As a result, continuous outflow of the in-furnace gas toward the pressure holding section is suppressed in the pressure equalizing part, and at the same time, the amount of accompanying dust flowing out along with the flow of the in-furnace gas can be reduced.

A coal gasification combined power generation facility of the present invention includes the above-described gasification furnace apparatus.

According to this coal gasification combined power generation facility, since it includes the gasification furnace apparatus described in claim 5, continuous outflow of the in-furnace gas toward the pressure holding section is suppressed in the pressure equalizing part of the gasification furnace apparatus, and at the same time, the amount of accompanying dust flowing out along with the flow of the in-furnace gas can be reduced.

A pressure equalizing method for a gasification furnace apparatus of the present invention includes: a gasification furnace for gasifying a carbon-containing fuel; a pressure vessel housing the gasification furnace; and a pressure holding section filled with a pressurizing gas and provided between the gasification furnace and the pressure vessel, wherein the inside of the gasification furnace and the inside of the pressure holding section are communicated with each other in a region where the in-furnace gas temperature inside the gasification furnace is higher than the temperature inside the pressure holding section.

According to this pressure equalizing method for a gasification furnace apparatus, the in-furnace gas flowing out into the pressure holding section is less likely to cause natural convection, since the inside of the gasification furnace and the inside of the pressure holding section are communicated with each other in a region where the in-furnace gas temperature inside the gasification furnace is higher than the annulus temperature inside the pressure holding section. As a result, continuous outflow of the in-furnace gas toward the pressure holding section is suppressed in the part where the inside of the gasification furnace and the inside of the pressure holding section communicate with each other, and at the same time, the amount of accompanying dust flowing out along with the flow of the in-furnace gas can be reduced.

In the above-described pressure equalizing method, it is preferable that the gasification furnace is a tower type, and that the pressure equalizing part is provided close to the top part of the tower-type gasification furnace. This way, the space above the pressure equalizing part inside the pressure holding section can be made smaller. As a result, the region above the pressure equalizing part, where natural convection can be created, becomes smaller, so that the area of convection can be minimized.

In the pressure equalizing method of the above-described configuration, it is preferable that the pressure equalizing part includes an open outlet which is open downward inside the pressure holding section, and that a dust tray is disposed under the open outlet. This way, the accompanying dust flowing out into the pressure holding section along with the in-furnace gas during normal operation can be collected in the dust tray. It is desirable that a pipe, etc. forming the pressure equalizing part is bent downward so that the open outlet of the pressure equalizing part is extended close to the dust tray.

In addition, it is preferable that the dust tray in this case is provided annularly inside the pressure holding section so as to surround the outer periphery of the gasification furnace. This way, spill of the collected accompanying dust onto the bottom part of the pressure holding section can be prevented.

Advantageous Effects of Invention

According to the above-described present invention, in a gasification furnace apparatus for gasifying a carbon-containing fuel, natural convection occurring inside the annulus section due to the in-furnace gas flowing out into the annulus section can be suppressed, and the amount of the in-furnace gas and accompanying dust flowing out into the annulus section can be reduced. Accordingly, the durability and the reliability of the pressure vessel improve, and the plant equipped with the gasification furnace apparatus can be continuously operated in a stable manner.

In addition, since the accompanying dust flowing out into the annulus section can be collected in the dust tray, the time and labor for cleanup can be reduced.

BRIEF DESCRIPTION OF DRAWING

FIG. 1 is a cross-sectional view showing a configuration example of a pressure equalizing structure and a pressure equalizing method for a gasification furnace apparatus according to the present invention, as one embodiment applied to a tower-type gasification apparatus.

DESCRIPTION OF EMBODIMENT

In the following, one embodiment of a pressure equalizing structure and a pressure equalizing method for a gasification furnace apparatus according to the present invention will be described on the basis of the drawing.

A gasification furnace apparatus 1 of the embodiment shown in FIG. 1 is a tower-type gasification furnace apparatus for gasifying a carbon-containing fuel such as coal. This gasification furnace apparatus 1 includes: a gasification furnace 3 for gasifying a carbon-containing fuel; a pressure vessel 5 housing the gasification furnace 3; and an annulus section 7 filled with an inert gas serving as a pressurizing gas and provided between the gasification furnace 3 and the pressure vessel 5. The annulus section 7 is a pressure holding section which is filled with a pressurizing gas such as a nitrogen gas and maintained at a high pressure, and in the case of the gasification furnace apparatus 1, the annulus section is an annular space.

The tower-type gasification furnace 3 generates gas, for example, by combusting a carbon-containing fuel, such as pulverized coal (coal), inside the substantially cylindrical furnace. The generated gas is an in-furnace gas which flows inside the gasification furnace from the lower side to the upper side, and flows out of the furnace through a gasification furnace outlet 3a at the upper end of the furnace. The peripheral wall of the gasification furnace 3 serves as a water wall on which peripheral wall boiler water for cooling the in-furnace gas flows.

Multiple heat exchangers 9 are installed in series in a region inside the gasification furnace 3, from near the middle stage up to near the outlet of the upper stage, so that the in-furnace gas flowing from the lower side to the upper side passes through the heat exchangers. The heat exchangers 9 generate steam by utilizing the sensible heat of the in-furnace gas. In the illustrated configuration example, an evaporator 9a, a second steam heater 9b, a first steam heater 9c, and an economizer 9d are arranged in series in this order from the lower side to the upper side of the gasification furnace 3, although the present invention is not limited to this configuration.

The pressure vessel 5 forms an annular space serving as the annulus section 7 outside the gasification furnace wall of the gasification furnace 3. This annulus section 7 is a space filled with an inert gas such as a nitrogen gas and maintained at a high pressure, and provided so as to cover the entire periphery of the gasification furnace 3. That is, the annulus section 7 filled with an inert gas is provided between the gasification furnace wall of the gasification furnace 3 and the pressure vessel 5, in order to protect the pressure vessel 5 from the in-furnace gas flowing inside the furnace at a high temperature.

In the gasification furnace apparatus 1 of this embodiment, a pressure equalizing pipe 11, which is connected to the gasification furnace 3 to communicate between the inside of the gasification furnace 3 and the inside of the annulus section 7, is provided in a region where the in-furnace gas temperature is higher than the annulus temperature. Since the pressure equalizing pipe 11 communicates between the inside of the gasification furnace 3 and the inside of the annulus section 7, the inside of the pressure equalizing pipe 11 works as a pressure equalizing part 13. The in-furnace gas temperature refers to the gas temperature of the gas generated inside the gasification furnace 3, while the annulus temperature refers to the environmental temperature (inert gas temperature) inside the annulus section 7.

The reason why the pressure equalizing part 13 should be provided in a region where the in-furnace gas temperature is higher than the annulus temperature is that that way the in-furnace gas flows out into the annulus section 7 at a temperature higher than the temperature of the inert gas and is less likely to cause natural convection inside the annulus section 7. That is, when the pressures are equalized in a region where the in-furnace gas temperature is higher than the annulus temperature, the in-furnace gas flowing out into the annulus section 7 is less likely to cause natural convection inside the annulus section 7.

As a result, continuous outflow of the in-furnace gas toward the annulus section 7 is suppressed, and at the same time, the amount of accompanying dust inside the furnace flowing out along with the flow of the in-furnace gas can be reduced. That is, the amount of in-furnace gas flowing out into the annulus section 7 through the pressure equalizing pipe 11 is reduced, so that the amount of accompanying dust such as char entrained in the flow of this in-furnace gas and flowing out into the annulus section 7 is also reduced.

When the gasification furnace 3 of the gasification furnace apparatus 1 is a tower type, it is desirable that the above-described pressure equalizing part 13 is provided close to the top part of the tower-type gasification furnace. In this case, the temperature of the in-furnace gas, which has passed through the economizer 9d located at the uppermost stage and on the most downstream side, is set to be higher than the peripheral wall boiler water temperature, and therefore the in-furnace gas temperature is higher than the annulus temperature.

Thus, when the pressure equalizing part 13 is disposed in the top part which is close to the gasification furnace outlet 3a on the downstream side of the economizer 9d, the space above the pressure equalizing part 13 inside the annulus section 7 becomes smaller. That is, since natural convection of the in-furnace gas is created above the outlet of the pressure equalizing pipe 11, the area of convection can be minimized by making the region above the pressure equalizing part, where natural convection can be created, smaller (shorter).

The pressure equalizing part 13 formed inside the above-described pressure equalizing pipe 11 includes an open outlet 11a which is so formed by bending the pressure equalizing pipe 11 as to open downward inside the annulus section 7. Under this open outlet 11a is disposed a dust tray 15. This dust tray 15 collects the accompanying dust flowing out into the annulus section 7 along with the in-furnace gas during normal operation of the gasification furnace apparatus 1, and prevents the accompanying dust from falling down to the bottom part of the gasification furnace 3. In this case, it is desirable that the pressure equalizing pipe 11 is extended close to the dust tray 15 so that the open outlet 11a of the pressure equalizing part 13 is provided close to the dust tray 15.

It is also desirable that the above-described dust tray 15 is provided annularly inside the annulus section 7 so as to surround the outer periphery of the gasification furnace 3. This annular tray 15 can effectively prevent the spill of the collected accompanying dust onto the bottom part of the annulus section 7.

Thus, according to the above-described gasification furnace apparatus 1, it is possible to implement the pressure equalizing method which includes: the gasification furnace 3 for gasifying a carbon-containing fuel; the pressure vessel 5 housing the gasification furnace 3; and the annulus section 7 filled with an inert gas and provided between the gasification furnace 3 and the pressure vessel 5, and equalizes the pressures by communicating between the inside of the gasification furnace 3 and the inside of the annulus section 7 in a region where the in-furnace gas temperature inside the gasification furnace 3 is higher than the annulus temperature inside the annulus section 7. Thus, the in-furnace gas flowing out into the annulus section 7 is less likely to cause natural convection.

Accordingly, continuous outflow of the in-furnace gas toward the annulus section 7 is suppressed in the part where the inside of the gasification furnace 3 and the inside of the annulus section 7 communicate with each other, and at the same time, the amount of accompanying dust flowing out along with the flow of the in-furnace gas can be reduced. In this pressure equalizing method for the gasification furnace apparatus 1, the area where convection is created inside the annulus section 7 can be made smaller, especially when the gasification furnace 3 is a tower type and the communication part serving as the pressure equalizing part 13 between the inside of the gasification furnace 3 and the inside of the annulus section 7 is provided close the top part of the tower-type gasification furnace.

Thus, according to the above-described embodiment, in the gasification furnace apparatus 1 for gasifying a carbon-containing fuel, natural convection occurring inside the annulus section 7 due to the in-furnace gas flowing out into the annulus section 7 can be suppressed, and the amount of in-furnace gas and accompanying dust flowing out into the annulus section 7 can be reduced. Accordingly, the durability and the reliability of the pressure vessel 5 improve, and the plant equipped with the gasification furnace apparatus 1 can be continuously operated in a stable manner. In addition, since the accompanying dust flowing out into the annulus section 7 can be collected in the dust tray 15, the time and labor for cleanup of the inside of the gasification furnace 3 can be reduced.

The above-described gasification furnace apparatus 1 can be applied to a coal gasification combined power generation facility. The coal gasification combined power generation facility operates a gas turbine with a fuel obtained by gasifying coal in the gasification furnace apparatus 1, and generates power by driving a generator with the output of the gas turbine. Further, the coal gasification combined power generation facility generates steam by introducing high-temperature exhaust gas discharged from the gas turbine (gas turbine exhaust heat) into an exhaust heat recovery boiler, and drives the generator also with the output of a steam turbine operated with this steam. Thus, the coal gasification combined power generation facility is called an efficient power generation facility.

In the above-described embodiment, the present invention is applied to the tower-type gasification furnace 3; however, in terms of providing the pressure equalizing part in a region where the in-furnace gas temperature inside the gas furnace is higher than the annulus temperature inside the annulus section, the present invention can be applied not only to the tower-type but also to a crossover-type gasification furnace, etc.

It is intended that the present invention is not limited to the above-described embodiment, and can be appropriately changed within the scope of the present invention.

REFERENCE SIGNS LIST

1 Gasification furnace apparatus
3 Gasification furnace
5 Pressure vessel
7 Annulus section
9 Heat exchanger
11 Pressure equalizing pipe
11a Open outlet
13 Pressure equalizing part
15 Dust tray

The invention claimed is:

1. A pressure equalizing method for a gasification furnace apparatus including a gasification furnace for gasifying a carbon-containing fuel, a pressure vessel housing the gasification furnace, a pressure holding section filled with a pressurizing gas and provided between the gasification furnace and the pressure vessel, a pressure equalizing part which is connected to the gasification furnace in the pressure vessel, which communicates between the inside of the gasification furnace and the inside of the pressure holding section, and which equalizes the pressure inside the gasification furnace and the pressure inside the pressure holding section, and at least one heat exchanger installed along a passing direction of an in-furnace gas flowing inside the gasification furnace, the pressure equalizing method comprising:
setting a temperature of the in-furnace gas, which has passed through the heat exchanger located on the most downstream side, to be higher than a peripheral wall boiler water temperature; and
equalizing the pressure inside the gasification furnace and the pressure inside the pressure holding section by communicating the inside of the gasification furnace with the inside of the pressure holding section in a region where the in-furnace gas temperature inside the gasification furnace is higher than the temperature inside the pressure holding section.

2. The pressure equalizing method for a gasification furnace apparatus according to claim 1, wherein the gasification furnace is a tower type, and the pressure equalizing part is provided close to the top part of the tower-type gasification furnace.

3. The pressure equalizing method for a gasification furnace apparatus according to claim 1, further comprising collecting accompanying dust in the pressure holding section, the accompanying dust flowing out into the pressure holding section from the gasification furnace.

4. The pressure equalizing method for a gasification furnace apparatus according to claim 3, wherein the dust tray is provided annularly inside the pressure holding section so as to surround the outer periphery of the gasification furnace.

* * * * *